US005087507A

United States Patent [19]

Heinzer

[11] Patent Number: 5,087,507

[45] Date of Patent: Feb. 11, 1992

[54] METHOD OF RENDERING A DOCUMENT OR PORTION OF IT RESISTANT TO PHOTOCOPYING

[75] Inventor: Paul Heinzer, Pully/Lausanne, Switzerland

[73] Assignee: Lipatec Etablissement, Vaduz, Liechtenstein

[21] Appl. No.: 268,754

[22] Filed: Nov. 8, 1988

[30] Foreign Application Priority Data

Nov. 20, 1987 [CH] Switzerland .......................... 4518/87

[51] Int. Cl.[5] ............................................. B32B 3/00

[52] U.S. Cl. .................................... 428/195; 156/277; 283/109; 283/114; 283/902; 355/201; 427/7; 427/261; 428/203; 428/916; 430/10

[58] Field of Search .................... 156/277; 427/7, 261; 428/916, 195, 203; 283/109, 902, 114; 430/10; 355/201

[56] References Cited

U.S. PATENT DOCUMENTS 4,118,122 10/1978 Rees .................................. 283/114

FOREIGN PATENT DOCUMENTS 2429292 2/1980 France ................................ 283/902

*Primary Examiner*—John J. Gallagher
*Attorney, Agent, or Firm*—Herbert Dubno; Andrew M. Wilford

[57] ABSTRACT

An article with at least a portion carrying symbols representing information to be protected against photocopying is formed by a carrier, a continuous layer covering the portion of the carrier and forming a background thereon, and a mainly discontinuous layer applied on the continuous layer and forming the symbols against the background. One of the layers is an iridescent layer of a color that copies dark and the other of the layers has a dark color. Thus photocopying gives an image without distinction between the symbols and the background.

2 Claims, 1 Drawing Sheet

METHOD OF RENDERING A DOCUMENT OR PORTION OF IT RESISTANT TO PHOTOCOPYING

FIELD OF THE INVENTION

The present invention relates to a method of preparation of a document comprising a sheet bearing alphanumeric or graphical information of which at least a portion is uncopyable.

BACKGROUND OF THE INVENTION

A document comprising a sheet, such as film or paper bearing alphanumeric or graphical information, prepared by handwriting, typewriter, photocopier, printer, telex, and fax, can be reproduced by a great number of photocopiers without the consent of the owner. The illegal copier of documents is more and more frequent in the fields of economy, science, politics or the military and can cause immense financial or moral damages.

The effort to protect official documents, such as banknotes, checks, bonds, identity cards and passports against falsification has led to technical solutions based on the utilization of counterfeit deterrents, such as filigranes, threads, fibers, colored or metallized or magnetized elements. The state of the art is described in British patent 1 127 043. Unfortunately the security papers prepared according to these methods do not protect the documents, or protect them only insufficiently against photocopying.

Several methods of preventing copyability of documents have been patented and, in a few cases, commercialized. A paper coated with a cacao-colored layer has been produced by Calspan and Ludlow Paper Co., Needham Heights, Mass., USA. U.S. Pat. No. 3,597,082 mentions photochromic pigments to avoid photocopying. The French patent 2 177 292, assigned to IBM, uses special inks printed on a masking background. U.S. Pat. No. 4,578,298 describes a selfadhesive film protecting documents against photocopying. This product comprises a colored film coated on a semi-transparent, vacuum-metallized film. Nocopy International Inc. has commercialized a security paper based on dark pigments covering the sensitivity spectrum of modern photocopiers.

All these products are expensive to manufacture or limited in their application, or else have poor contrast.

OBJECT OF THE INVENTION

The object of the present invention is to provide a simple and inexpensive method of preparing documents resistant to photocopying on office copiers and having a good contrast for the human eye.

According to the present invention the portion of the document resistant to photocopy is provided with adjacent zones of layers containing at least one iridescent substance and layers containing a dark color.

The present invention is based on the discovery made during the course of searching for a method of rendering documents resistant to photocopying that layers containing one or more iridescent substances will always—independent of the light intensity—give a black image (i.e. copy dark) and this regardless of the color of the layer containing the iridescent pigment or pigments. By juxtaposing zones containing dark pigments and zones containing such iridescent pigments, the original image formed has a good contrast for the human eye, but gives a black copy without a discernible image for the human eye.

An iridescent substance is a pigment coated with a thin film which, through light interference, provokes reflection of rainbow colors depending on the angle of observation. Examples of iridescent pigments adapted to the present invention are mica plates coated with a thin layer of titanium dioxide. Interference colors are formed by refraction and reflection of light on the $TiO_2$ layer due to its high refractive index. The different color shades are obtained by modifying the $TiO_2$ layer thickness. The double coating of a mica plate with $TiO_2$and a colored layer, such as iron (III) oxide or chromium (III) oxide gives iridescent pigments with brilliant colors combining the action of pearl luster pigments and colored pigments. Such pigments allow metallic effects without the negative properties of metal or its alloys. The particles size determines the end effect. Large particle sizes give glitter effects, whereas smaller size particles give a satin luster. Among the iridescent pigments may be mentioned, for example, Iriodin pigments from E. Merck, D-6100 Darmstadt, and Merlin Luster pigments from The Mearl Corporation, New York, N.Y., USA.

During the course of this research it has been found that the iridescent effect can be reinforced by coating the layer containing one or several iridescent pigments on a dark colored substrate.

Layers containing one or more iridescent pigments can be prepared according to the technologies known in the printing and coating industries. I can mention, for example, gravure printing, offset or Meyerbar coating. The layers can be coated either as a continuous surface on the uncopyable part of the document, or as alphanumeric or graphical information. One can also deposit the layers containing one or more iridescent pigments in the shape of a raster or any other pattern.

The dark layers, generally in form of alphanumeric or graphical information, can be formed according to known techniques, for example, handwriting or mechanical writing, or else printing, such as offset or gravure. The dark layer can also be formed by non-impact printing, such as ink jet, laser printer, photocopy or thermo-transfer. Such dark layers can also be deposited by chemical reaction, as found in silver photography, by diazo reaction or from carbonless papers. Further information on such chemical image formation can be found in patents GB 1 298 194, U.S. Pat. No. 137,084 and U.S. Pat. No. 4,162,165.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
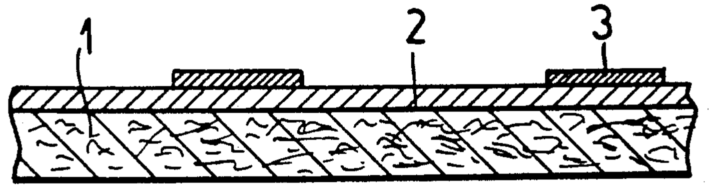
FIGS. 1 to 4 are cross sectional views illustrating products made by the method of the invention.

FIG. 1 is an enlarged, fragmentary, sectional view of the uncopyable portion of a document prepared according to a first embodiment of the method of applying the present invention. This method consists of depositing on a white or colored sheet 1 a single layer 2 containing at least one iridescent substance. The layers 3 of dark color are then deposited onto the coated sheet 1 in form of the desired information, for example, by handwriting or photocopying. In this latter case, one introduces in a copier the sheet 1 instead of a normal white paper. Offset printing onto sheet 1 is also possible. The document prepared according to the present method is uncopyable since any photocopy of it will give a black copy without information.

Figure 2:
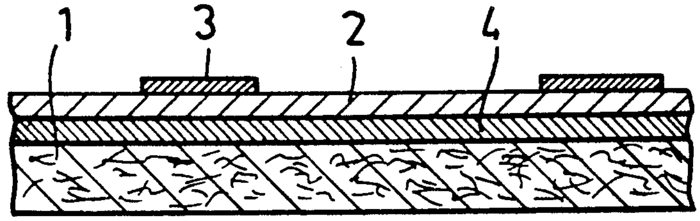

FIG. 2 is an enlarged, fragmentary, sectional view of the uncopyable portion of a document obtained by a second embodiment of the method of putting the present invention into practice. On a white or colored sheet 1 is deposited successively a single continuous dark layer 4 and then a second layer 2 containing at least one iridescent pigment; on top of layer 2 are deposited the dark layers 3 in the shape of alphanumeric or graphical information. The presence of layer 4 reinforces the effects of the iridescent pigment or pigments contained in layer 2 so that a photocopy of a document prepared according to this method two will be darker than the copy of documents prepared according to FIG. 1 and thus give an improved security against abusive reproduction.

Figure 3:
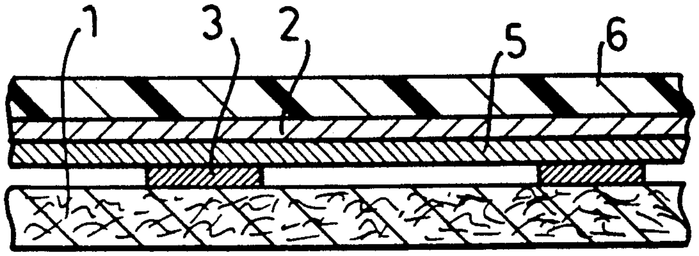

FIG. 3 is an enlarged, fragmentary, sectional view of a document obtained by a third embodiment of the method of putting the present invention into practice. According to this method, dark layers 3 in the shape of information are deposited onto a white or colored sheet 1. Then, on top of layer 3 a single continuous layer 2 containing at least one iridescent pigment which has previously been coated on a transparent film 6 is glued by means of self-adhesive layer 5. This special self-adhesive film formed by the transparent film 6, the layer 2 and adhesive 5 is produced in advance by coating the film 6 first with layer 2 and then with the adhesive layer 5 before laminating it onto sheet 1. This mode of putting the present invention into practice is particularly suitable for protecting existing documents from photocopying. By using a repositionable adhesive one can simplify the preparatory work of adhering the self-adhesive film flatly onto the document in order to render a portion of it uncopyable.

Figure 4:
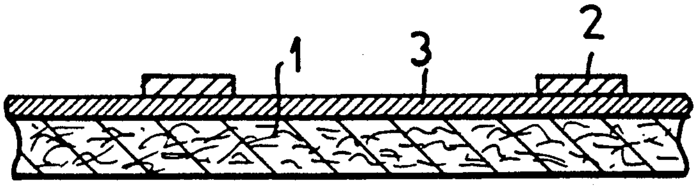

FIG. 4 is an enlarged, fragmentary, sectional view of an uncopyable document obtained by a fourth method of putting the present invention into practice. A white or colored sheet 1 is first coated with a single continuous dark layer 3 and, subsequently, this layer 3 is coated with layers 2 containing at least one iridescent pigment in the shape of alphanumeric or graphical information. In fact, layers 2 can be obtained by printing the sheet 1 with an ink containing at least one iridescent pigment. Layers 2 can also be prepared by transferring thermally from a special film containing at least one iridescent pigment a layer on top of a preformed xerographic toner image. Such a transfer process is commercialized by Omnicrom Systems Ltd., GB-Bolton. The photocopy of a document prepared according to this method gives a black surface without any image.

I claim:

1. A method of preparing a document consisting of a sheet at least a portion of which carries alphanumeric or graphical information and resistant to photocopying, the method comprising the steps of:
   - applying a continuous layer of a color that copies black directly to the portion of the sheet;
   - applying to the portion of the sheet directly over the layer of color that copies black a continuous layer of an iridescent substance; and
   - applying to the sheet directly over the iridescent-substance layer a layer forming the information against the continuous layer and having a dark color that also copies black, whereby photocopying gives a black copy without information.

2. An article with at least a portion carrying information to be protected against photocopying, the article consisting essentially of:
   - a sheet;
   - a continuous layer of a color that copies black directly covering the portion of the sheet;
   - a continuous layer covering the portion of the sheet directly over the layer of the color that copies black and constituted as an iridescent layer; and
   - a layer applied directly on the continuous iridescent layer, forming the information against the continuous layer, and having a dark color that also copies black, whereby photocopying gives a black copy without information.

* * * * *